United States Patent [19]

Huygens

[11] Patent Number: 5,491,176

[45] Date of Patent: Feb. 13, 1996

[54] PROCESS FOR PREPARING FLEXIBLE FOAMS

[75] Inventor: Eric Huygens, Heverlee, Belgium

[73] Assignee: Imperial Chemical Industries PLC, London, England

[21] Appl. No.: 462,093

[22] Filed: Jun. 5, 1995

[30]     Foreign Application Priority Data

Jun. 16, 1994 [GB]  United Kingdom ............. 9412105
Oct. 30, 1994 [EP]  European Pat. Off. ........ 94203786

[51] Int. Cl.$^6$ .................................................. C08G 18/10
[52] U.S. Cl. .................. 521/159; 521/160; 521/163; 521/170; 521/174; 521/176
[58] Field of Search ............................ 521/159, 160, 521/163, 170, 174, 176

[56]     References Cited

U.S. PATENT DOCUMENTS

| | | | |
|---|---|---|---|
| 4,478,960 | 10/1984 | Buethe et al. | 521/160 |
| 4,833,176 | 5/1989 | Wolf et al. | 521/160 |
| 4,945,117 | 7/1990 | Gansen et al. | 521/99 |
| 5,236,960 | 8/1993 | Harrison et al. | 521/160 |
| 5,240,635 | 8/1993 | DeGenova et al. | 521/160 |
| 5,369,138 | 11/1994 | Gansen | 521/159 |
| 5,416,125 | 5/1995 | Liman et al. | 521/160 |
| 5,418,261 | 5/1995 | Helsmans et al. | 521/160 |

FOREIGN PATENT DOCUMENTS

| | | |
|---|---|---|
| 0010850 | 5/1980 | European Pat. Off. . |
| 0022617 | 1/1981 | European Pat. Off. . |
| 0392788 | 10/1990 | European Pat. Off. . |
| 0398304 | 11/1990 | European Pat. Off. . |
| 0420273 | 4/1991 | European Pat. Off. . |
| 0422811 | 4/1991 | European Pat. Off. . |
| 0442631 | 8/1991 | European Pat. Off. . |
| 0451826 | 10/1991 | European Pat. Off. . |
| 62172011 | 9/1981 | Japan . |
| 3200289 | 7/1987 | Japan . |
| 93/08224 | 4/1993 | WIPO . |

*Primary Examiner*—Morton Foelak

[57]     ABSTRACT

Process for preparing a flexible foam by reacting an isocyanate-terminated prepolymer having an NCO value of 5–18% by weight, a polyisocyanate having an NCO value of at least 25% by weight, 20–95 parts by weight, per 100 parts by weight of polyisocyanate, of an isocyanate-reactive compound of molecular weight of 1000–12000, and water.

6 Claims, No Drawings

PROCESS FOR PREPARING FLEXIBLE FOAMS

The present invention is concerned with a process for preparing flexible polyurethane foams.

It is widely known to prepare flexible polyurethane foams by reacting an organic polyisocyanate and a high molecular weight isocyanate-reactive compound in the presence of a blowing agent. More in particular it has been disclosed in EP-111121 to prepare flexible polyurethane foams from a polyisocyanate composition comprising a semi-prepolymer. The polyisocyanate composition is prepared by reacting a diphenylmethane diisocyanate and a polyol; a polymethylene polyphenylene polyisocyanate (polymeric MDI) is used as well.

In EP-392788 flexible foams are prepared by reacting semi-prepolymers or prepolymers with an isocyanate-reactive composition containing a high amount of water.

In EP-296449 flexible foams are prepared by reacting polyisocyanates, polyols and water at a relatively low NCO index.

In EP-442631 it has been disclosed to prepare a flexible foam from a prepolymer and another polyisocyanate, which are transferred independently from different storage tanks to the mixing head of a foaming device, and from an isocyanate-reactive composition comprising a high amount of water.

Surprisingly it was found that it is possible to significantly extend the hardness/density foam range accessible with the above described technology while maintaining similar foam strength properties. Thus lower density foam with similar or higher hardness and good strength properties can be obtained. Further the processing is improved.

Accordingly the present invention is concerned with a process for preparing a flexible foam by reacting
1) at least two organic polyisocyanates with
2) an isocyanate-reactive compound containing at least two isocyanate-reactive hydrogen atoms and having a number average molecular weight of 1000 to 12000; and optionally with
3) an isocyanate-reactive compound containing at least two isocyanate-reactive hydrogen atoms and having a number average molecular weight of 60 to 999; and with
4) water; optionally in the presence of
5) a catalyst and
6) other auxiliaries and additives known per se, wherein
   a) one organic polyisocyanate (a1) is an isocyanate terminated prepolymer having an NCO value of 5–18, preferably 5–15 and most preferably 5–10% by weight, prepared by reacting an excessive amount of a diphenylmethane diisocyanate with an isocyanate-reactive compound containing at least two isocyanate-reactive hydrogen atoms and having a number average molecular weight of 1000 to 12000; and wherein another organic polyisocyanate (a2) is a polyisocyanate having an NCO value of at least 25% by weight;
   b) 20–95 and preferably 20–80 parts by weight of isocyanate-reactive compound 2) is used per 100 parts by weight of organic polyisocyanates 1); and
   c) the reaction is conducted at an index of 40–130 and preferably above 70 to 110 with the proviso that the weight ratio of (a1):(a2)=5:1 to 1:1, preferably 4:1 to 1:1 and most preferably 2:1 to 1:1, the weight ratio of organic polyisocyanate 1):2)+3)+4)=4.7:1 to 1:1 and the weight ratio of 2)+3):4)=20:1 to 2:1.

Further the present invention is concerned with a reaction system comprising the above mentioned ingredients with the proviso that the polyisocyanates are kept in a container separate from the isocyanate-reactive compounds.

In the context of the present invention the following terms have the following meaning:
1) isocyanate index or NCO index or index: the ratio of NCO-groups over isocyanate-reactive hydrogen atoms present in a formulation, given as a percentage:

$$\frac{NCO\mathit{l} \times 100}{[\text{active hydrogen}]} \; (\%).$$

In other words the NCO-index expresses the percentage of isocyanate actually used in a formulation with respect to the amount of isocyanate theoretically required for reacting with the amount of isocyanate-reactive hydrogen used in a formulation.

It should be observed that the isocyanate index as used herein is considered from the point of view of the actual foaming process involving the isocyanate ingredient and the isocyanate-reactive ingredients. Any isocyanate groups consumed in a preliminary step to produce modified polyisocyanates (including such isocyanate-derivatives referred to in the art as quasi or semi-prepolymers and prepolymers) or any active hydrogens reacted with isocyanate to produce modified polyols or polyamines, are not taken into account in the calculation of the isocyanate index. Only the free isocyanate groups and the free isocyanate-reactive hydrogens (including those of the water) present at the actual foaming stage are taken into account.

2) The expression "isocyanate-reactive hydrogen atoms" as used herein for the purpose of calculating the isocyanate index refers to the total of hydroxyl and amine hydrogen atoms present in the reactive compositions in the form of polyols, polyamines and/or water; this means that for the purpose of calculating the isocyanate index at the actual foaming process one hydroxyl group is considered to comprise one reactive hydrogen, one primary amine group is considered to comprise one reactive hydrogen and one water molecule is considered to comprise two active hydrogens.

3) Reaction system: a combination of components wherein the polyisocyanates are kept in one or more containers separate from the isocyanate-reactive components.

4) The expression "polyurethane foam" as used herein generally refers to cellular products as obtained by reacting polyisocyanates with isocyanate-reactive hydrogen containing compounds, using foaming agents, and in particular includes cellular products obtained with water as reactive foaming agent (involving a reaction of water with isocyanate groups yielding urea linkages and carbon dioxide and producing polyurea-urethane foams).

5) The term "average nominal hydroxyl functionality" is used herein to indicate the number average functionality (number of hydroxyl groups per molecule) of the polyol composition on the assumption that this is the number average functionality (number of active hydrogen atoms per molecule) of the initiator(s) used in their preparation although in practice it will often be somewhat less because of some terminal unsaturation.

The diphenylmethane diisocyanate (MDI) used for making prepolymer (a1) may be selected from pure 4,4'-MDI and isomeric mixtures of 4,4'-MDI and 2,4'-MDI and less than 10% by weight of 2,2'-MDI and modified variants thereof containing carbodiimide, uretonimine, isocyanurate, urethane, allophanate, urea or biuret groups. Most preferred are pure 4,4'-MDI, isomeric mixtures with 2,4'-MDI, and uretonimine and/or carbodiimide modified MDI having an NCO content of at least 25% by weight and urethane modified MDI obtained by reacting excess MDI and a polyol, having an average nominal hydroxyl functionality of 2–6 and a number average molecular weight of 60–999, and having an NCO content of at least 25% by weight.

In preparing the flexible foams according to the present invention another polyisocyanate (a2) having an NCO value of at least 25% by weight is used. Such polyisocyanate may be selected from aliphatic, cycloaliphatic and araliphatic polyisocyanates, for example hexamethylene diisocyanate, isophorone diisocyanate, cyclohexane- 1,4-diisocyanate, 4,4'-dicyclohexylmethane diisocyanate and m- and p-tetramethylxylene diisocyanates and, especially, aromatic polyisocyanates; most preferably tolylene diisocyanates, diphenylmethane diisocyanates (described above for making the prepolymer) and polymethylene polyphenylene polyisocyanates and mixtures thereof are used.

Polymethylene polyphenylene polyisocyanates are known as such and are polyisocyanates containing MDI and MDI-homologues having isocyanate functionalities of 3 or more. These polyisocyanates are often referred to as "crude MDI" or "polymeric MDI" and are made by the phosgenation of a mixture of polyamines obtained by the acid condensation of aniline and formaldehyde. The manufacture of both the polyamine mixtures and the polyisocyanate mixtures is well known. The condensation of aniline with formaldehyde in the presence of strong acids such as hydrochloric acid gives a reaction product containing diaminodiphenylmethane together with polymethylene polyphenylene polyamines of higher functionality, the precise composition depending in known manner on the aniline/formaldehyde ratio. The polyisocyanates are made by phosgenation of the polyamine mixtures and the various proportions of diamines, triamines and higher polyamines give rise to related proportions of diisocyanates, triisocyanates and higher polyisocyanates. The relative proportions of diisocyanate, triisocyanate and higher polyisocyanates in the crude diphenylmethane diisocyanate compositions determine the average functionality of the compositions, that is the average number of isocyanate groups per molecule. By varying the proportions of starting materials, the average functionality of the polyisocyanate compositions can be varied from little more than 2 to 3 or even higher. In practice, however, the number average isocyanate functionality preferably ranges from 2.35 to 2.9. The NCO value of these polymeric MDIs is at least 30% by weight. Such compositions contain from 30 to 65 and preferably 40–65 and most preferably 50–65% by weight of diphenylmethane diisocyanate, the remainder being polymethylene polyphenylene polyisocyanates of isocyanate functionality greater than two together with by-products formed in the manufacture of such polyisocyanates by phosgenation. These products, being liquids, are convenient to use according to the present invention.

The compounds containing at least two isocyanate-reactive hydrogens and having a number average molecular weight of 1000 to 12000 (isocyanate-reactive compound 2) and the isocyanate-reactive compound used in preparing prepolymer (a1) may be selected from polyesters, polyesteramides, polythioethers, polycarbonates, polyacetals, polyolefins, polysiloxanes and, especially, polyethers and they may be polyamines, like polyether polyamines, and especially polyols, like polyether polyols.

Polyether polyols which may be used include products obtained by the polymerisation of a cyclic oxide, for example ethylene oxide, propylene oxide, butylene oxide or tetrahydrofuran in the presence, where necessary, of polyfunctional initiators. Suitable initiator compounds contain a plurality of active hydrogen atoms and include water, butanediol, ethylene glycol, propylene glycol, diethylene glycol, triethylene glycol, dipropylene glycol, ethanolamine, diethanolamine, triethanolamine, toluene diamine, diethyl toluene diamine, phenyl diamine, diphenylmethane diamine, ethylene diamine, cyclohexane diamine, cyclohexane dimethanol, resorcinol, bisphenol A, glycerol, trimethylolpropane, 1,2,6-hexanetriol, pentaerythritol, sorbitol and sucrose. Mixtures of initiators and/or cyclic oxides may be used.

Especially useful polyether polyols include polyoxypropylene diols and triols and polyoxyethylene polyoxypropylene) diols and triols obtained by the simultaneous or sequential addition of ethylene oxide and propylene oxide to di- or trifunctional initiators as fully described in the prior art. Random copolymers having oxyethylene contents of 10–80% by weight are preferred, as well as block copolymers having oxyethylene contents of up to 50 and preferably 10–40% by weight and random/block copolymers having oxyethylene contents of up to 50% preferably 10–40% by weight, (all based on the total weight of oxyalkylene units), in particular those having at least part and preferably all of the oxyethylene groups at the end of the polymer chain, i.e. so called EO-tipped polyols. Mixtures of the said diols and triols may be used as well. Small amounts of polyoxyethylene diols and triols may be used as well; the amount in general is less than 20% by weight on the amount of polyol 2) used.

Polyester polyols which may be used include hydroxyl-terminated reaction products of polyhydric alcohols such as ethylene glycol, propylene glycol, diethylene glycol, 1,4-butanediol, neopentyl glycol, 1,6-hexanediol, cyclohexane dimethanol, glycerol, trimethylolpropane, pentaerythritol or polyether polyols or mixtures of such polyhydric alcohols, and polycarboxylic acids, especially dicarboxylic acids or their ester-forming derivatives, for example succinic, glutaric and adipic acids or their dimethyl esters, sebacic acid, phthalic anhydride, tetrachlorophthalic anhydride or dimethyl terephthalate or mixtures thereof. Polyesters obtained by the polymerisation of lactones, for example caprolactone, in conjunction with a polyol, or of hydroxy carboxylic acids such as hydroxy caproic acid, may also be used.

Polyesteramides may be obtained by the inclusion of aminoalcohols such as ethanolamine in polyesterification mixtures.

Polythioether polyols which may be used include products obtained by condensing thiodiglycol either alone or with other glycols, alkylene oxides, dicarboxylic acids, formaldehyde, amino-alcohols or aminocarboxylic acids.

Polycarbonate polyols which may be used include products obtained by reacting diols such as 1,3-propanediol, 1,4-butanediol, 1,6-hexanediol, diethylene glycol or tetraethylene glycol with diaryl carbonates, for example diphenyl carbonate, or with phosgene.

Polyacetal polyols which may be used include those prepared by reacting glycols such as diethylene glycol, triethylene glycol or hexanediol with formaldehyde. Suitable polyacetals may also be prepared by polymerising cyclic acetals.

Suitable polyolefin polyols include hydroxy-terminated butadiene homo- and copolymers and suitable polysiloxane polyols include polydimethylsiloxane diols and triols.

Other polyols which may be used as isocyanate-reactive compound 2) comprise dispersions or solutions of addition or condensation polymers in polyols of the types described above. Such modified polyols, often referred to as "polymer polyols" have been fully described in the prior art and include products obtained by the in situ polymerisation of one or more vinyl monomers, for example styrene and/or acrylonitrile, in polymeric polyols, for example polyether polyols, or by the in situ reaction between a polyisocyanate and an amino- and/or hydroxy-functional compound, such as triethanolamine, in a polymeric polyol. Polyoxyalkylene polyols containing from 5 to 50% of dispersed polymer are particularly useful. Particle sizes of the dispersed polymer of less than 50 microns are preferred.

The number average molecular weight of the isocyanate-reactive compound preferably is 1000–8000 and most preferably 1500–7000; the average nominal functionality preferably is 2–4 and most preferably 2–3; the hydroxyl value preferably ranges from 15–200 and most preferably from 20–100.

Most preferred are polyoxyethylene polyoxypropylene polyols having a number average molecular weight of 2000–8000, an average nominal functionality of 2–3 and an oxyethylene content of 10–25% by weight, in particular the so-called EO-tipped polyols.

The isocyanate-terminated prepolymer (a1) is prepared by mixing the diphenylmethane diisocyanate and the isocyanate-reactive compound and allowing the mixture to react. Such reaction is allowed to take place at 60°–100° C. and in general the use of catalyst is not necessary. The relative amount of polyisocyanate and isocyanate-reactive compound depends on the desired NCO-value of the prepolymer, the NCO-value of the polyisocyanate and the OH value of the polyol used and can be easily calculated by those skilled in the art.

The chain-extending and cross-linking agents which optionally may be used (isocyanate-reactive compound 3)) may be selected from amines and polyols containing 2–8 and preferably 2–4 amine and/or hydroxy groups like ethanolamine, diethanolamine, triethanolamine, ethylene glycol, diethylene glycol, triethylene glycol, propylene glycol, dipropylene glycol, butanediol, glycerol, trimethylolpropane, pentaerithritol, sorbitol, sucrose, polyethylene glycol having a molecular weight of at most 999, toluene diamine, diethyl toluene diamine, cyclohexane diamine, phenyl diamine, diphenylmethane diamine, an alkylated diphenylmethane diamine and ethylene diamine.

The amount of chain-extending and cross-linking agents is, if applied, up to 25 and preferably less than 10 parts by weight per 100 parts by weight of the isocyanate-reactive compound 2).

The auxiliaries and additives which amongst others may be used are formation of urea and urethane enhancing catalysts like tertiary amines and tin compounds, surfactants, stabilisers, flame retardants, fillers and anti-oxidants.

The flexible polyurethane foams are prepared by combining and mixing ingredients 1)–6) and allowing the mixture to foam. Preferably ingredients 2)–6) are premixed and subsequently combined with the polyisocyanates.

The prepolymer and the polyisocyanate having an NCO value of at least 25% by weight may be transferred independently from different storage tanks connected to a mixing zone for mixing all ingredients for preparing the flexible foam. If not transferred independently the prepolymer and the polyisocyanate having an NCO value of at least 25% by weight preferably are mixed and then fed from one tank to a mixing zone for mixing the ingredients for preparing the flexible foam. If transported independently this prepolymer and this polyisocyanate are fed from different storage tanks connected to the mixing zone for mixing the ingredients for making the flexible foam; said tanks being connected to said zone directly or indirectly. When connected directly the prepolymer and polyisocyanate are fed directly and independently to said zone. When connected indirectly this prepolymer and polyisocyanate may be transported from the different tanks via different pipes which pipes join before the said zone to lead to this zone as a single pipe or may be transported independently from different tanks to a hold tank which may contain a mixing device, which hold tank is direclty connected to said mixing zone. Further deails in this respect are given in EP-442631.

The process may be used to make slab-stock or moulded flexible foams. The foams in general have a density of 15–80 kg/m$^3$ and may be used as cushioning material in furniture, car-seats and mattresses.

The present invention is illustrated by the following Examples.

EXAMPLES 1–3

An isocyanate-reactive composition was prepared by mixing polyol A, water, catalyst and surfactant in the amounts in parts by weight (pbw) given in the table. Polyisocyanate compositions were made by mixing prepolymer A and a polyisocyanate (see Table); amounts in pbw. These isocyanate-reactive and polyisocyanate compositions were mixed and allowed to react. The properties of the flexible foams obtained are given in the Table.

TABLE

| EXAMPLE | 1* | 2 | 3 |
|---|---|---|---|
| Prepolymer A | 80 | 42 | 80 |
| Polyisocyanate A | 20 | | 20 |
| Polyisocyanate B | | 28 | |
| Polyol A | | 20 | |
| Water | 2.48 | 2.48 | 4.95 |
| Dabco 8154 | 0.2 | 0.2 | 0.2 |
| Niax A1 | 0.15 | 0.15 | 0.15 |
| DMI | 0.24 | 0.24 | 0.4 |
| B 4113 | 1 | 1 | 1 |
| Free rise core density, Kg/m$^3$ (ISO 1855) | 31 | 29 | 22 |
| Compression hardness, kPa (ISO 3386/1) | 3.9 | 4.1 | 2.0 |
| Tear strength, N/m ISO 8307) | 150 | 140 | 120 |

*comparative examples

Glossary

Prepolymer A: the reaction product of Polyol A with a blend of 4,4'- and 2,4'-MDI (90/10–w/w ratio). The prepolymer was reacted 2 hours at 85° C. and had an NCO content of 6.8% by weight.

Polyisocyanate A: a polymeric MIDI composition with 39% by weight (% w) diisocyanate and 61% w higher oligomers of MDI. The diisocyanate fraction contains 6% w 2,4'-isomers. The NCO-content is 30.8% by weight.

Polyisocyanate B: a polymeric MDI composition with 55% w diisocyanate and 45% w higher oligomers of MDI. The diisocyanate fraction contains 15% w 2,4'-isomer. The NCO content is 31.6% by weight.

Polyol A: a 6000 MW polyoxypropylene triol with 15% w EO-tip. OH number is 28 mg KOH/g.

Dabco 8154: an amine catalyst supplied by Air Products.

Niax A1: an amine catalyst (dimethylaminodiethylether in dipropylene glycol, ratio 7/3 w/w) supplied by Osi specialities.

B 4113: a silicone surfactant supplied by Th. Goldschmidt AG.

DMI: 1,2-dimethyl imidazole.

I claim:

1. A process for preparing a flexible foam by reacting
1) at least two organic polyisocyanates with
2) an isocyanate-reactive compound containing at least two isocyanate-reactive hydrogen atoms and having a number average molecular weight of 1000 to 12000; and optionally with
3) an isocyanate-reactive compound containing at least two isocyanate-reactive hydrogen atoms and having a number average molecular weight of 60 to 999; and with
4) water; optionally in the presence of
5) a catalyst and
6) other auxiliaries and additives known per se, wherein
   a) one organic polyisocyanate (a1) is an isocyanate-terminated prepolymer having an NCO value of 5–18% by weight, prepared by reacting an excessive amount of a diphenylmethane diisocyanate with an isocyanate-reactive compound containing at least two isocyanate-reactive hydrogen atoms and having a number average molecular weight of 1000 to 12000; and wherein another organic polyisocyanate (a2) is a polyisocyanate having an NCO value of at least 25% by weight;
   b) 20–95 parts by weight of isocyanate-reactive compound 2) is used per 100 parts by weight of organic polyisocyanates 1); and
   c) the reaction is conducted at an index of 40–130 with the proviso that the weight ratio of (a1):(a2)=5:1 to 1:1, the weight ratio of organic polyisocyanate 1):2)+3)+4)=4.7:1 to 1:1 and the weight ratio of 2)+3):4)=20:1 to 2:1.

2. Process according to claim 1 wherein the NCO value of the prepolymer is 5–10% by weight.

3. Process according to claim 1 wherein the amount of isocyanate-reactive compound 2) is 20–80 parts by weight per 100 parts by weight of organic polyisocyanate.

4. Process according to claim 1 wherein the index is above 70 to 110.

5. Process according to claim 1 wherein the polyisocyanates are transferred independently from different storage tanks connected to a mixing zone for mixing ingredients 1) to 6).

6. Process according to claim 1 wherein polyisocyanate (a2) contains 40–65% by weight of diphenylmethane diisocyanate, the remainder being polymethylene polyphenylene polyisocyanates of isocyanate functionality greater than two together with byproducts formed in the manufacture of such polyisocyanates by phosgenation.

\* \* \* \* \*